United States Patent Office 2,752,386
Patented June 26, 1956

2,752,386

PRODUCTION OF COLORLESS OXO-ALCOHOL PLASTICIZER ESTERS

Norvik Ackroyd and Sidney Arthur Lamb, Norton-on-Tees, England, assignors to Imperial Chemical Industries Limited, a corporation of Great Britain No Drawing. Application August 14, 1950, Serial No. 179,376

Claims priority, application Great Britain September 12, 1949

10 Claims. (Cl. 260—475)

This invention relates to the production of the alkyl esters of organic carboxylic acids.

We have now found that if unsaturated alcohols are present in the alcohols used for the production of these esters, which are valuable as plasticisers, the resulting ester is of inferior colour and this often renders it less suitable for use as a plasticiser, and may ofter necessitate further treatment, which also adds to the cost. This applies particularly to alcohols produced by carbonylating olefine mixtures, e. g. cracked hydrocarbons which may contain alicyclic or other compounds readily giving hydroperoxides.

According to the present invention esters of improved quality are produced by esterifying an alcohol produced by the steps: carbonylating under superatmospheric pressure and at superatmospheric temperature in the liquid phase in the presence of a cobalt catalyst in suspended or dissolved form a mixture comprising mono-alkenes and substantially free from hydroperoxides or unsaturated alcohols derived from them, which mixture has been treated to reduce or minimise hydroperoxide formation either with an inhibitor free from nitrogen or by removing therefrom by known means, e. g. distillation, cyclo-mono-olefines and/or di- or poly-enes and other compounds readily yielding hydroperoxides; and thereafter hydrogenating the carbonylation product in the presence of a catalyst.

While the present invention does not depend on any particular theory, it is believed that alicyclic-mono-olefines, such as cyclohexene, and di- and poly-enes, but especially the first, which are commonly present in mixed olefines, yield hydroperoxides very readily and these last mentioned compounds readily degrade, for example during storage or on addition of the catalyst, to unsaturated, hydroxy compounds, for example cyclohex-1-ene-3-ol from cyclohex-1-ene-3-hydroperoxide. These unsaturated hydroxy compounds especially those derived from alicyclic compounds are not saturated in the normal hydrogenation step of the well known Oxo-reaction, and result in inferior colour characteristics of the ester prepared from alcohols containing them.

Among initial compounds giving rise to these undesirable materials are the alkyl cyclohexenes, cyclopentene, and the alkyl cyclopentenes.

If esters with very good colour characteristics are required it is preferable to remove the aforesaid objectionable classes of compounds from the olefine starting material, which in the case of such materials produced by cracking, should, preferably, be done immediately after their production. The preferred method of removing them is fractional distillation, although other methods may also be employed, e. g. azeotropic distillation, solvent extraction, extractive distillation.

While substantially complete removal of these hydroperoxide forming compounds may be achieved in the ways described in the last paragraph, these additional operations add to the cost. It is possible, although not with quite such good results, to reduce or substantially eliminate hydroperoxide formation by introducing an oxidation inhibitor into the desired fraction immediately after it is obtained by distillation of the product of the cracking operation. Suitable inhibitors are alkyl phenols, such as 2,4-dimethyl-6-butyl phenol or other 2,4,6-trialkylphenol, but nitrogen containing compounds are unsuitable because of their tendency to adversely affect the carbonylation reaction.

These inhibitors may be used, for example, in amounts of from 200 to 2000 parts per million. If the olefinic material is to be kept in storage for long periods before being carbonylated it is beneficial to add further quantities of inhibitor at intervals, since the inhibitor becomes oxidised gradually. In these circumstances it is also beneficial to store under an inert gas such as nitrogen.

If hydroperoxides or compounds derived from them are already present in the mixture to be carbonylated, the use of an inhibitor is less effective and the mixture is preferably treated before carbonylation for the removal or elimination of the undesirable compounds, e. g. by distillation.

The undesirable alicyclic compounds are distinguished by much higher density and refractive index than corresponding aliphatic compounds. This is illustrated for the $C_6$ compounds in the following table:

| Compound | Boiling point at atmospheric pressure, °C. | Refractive index, $n_D^{20}$ | Specific gravity at 24° C. |
|---|---|---|---|
| Hexene-1 | 63.5 | 1.388 | 0.673 |
| Cyclohexene | 83.2 | 1.447 | 0.811 |
| 1,4-Cyclohexadiene | 89.4 | 1.472 | 0.845 |

Consequently, by subjecting the mixture containing the undesirable compounds to fractional distillation and removing the fractions characterised by high refractive index, which are clearly distinguishable, it is possible to obtain a material which can be carbonylated and then hydrogenated to yield an alcohol product low in unsaturated alcohols and yielding esters of good colour.

The aliphatic di- and poly-enes also have higher densities and refractive indices (although the difference is not so strongly marked) than the corresponding aliphatic mono-alkenes, and the same criteria and methods of separation may be used.

It is desirable that the starting material for use in the carbonylation process should contain not more than 5 mg. of peroxide oxygen, and preferably less than 2 mg., per litre.

In the carbonylation step a reaction medium or a medium carrying the dissolved cobalt catalyst is sometimes used, and for this purpose alcohol product or heavy ends obtained therefrom are suitable. It is important that these materials should be free from unsaturated alcohols.

The process of the invention is specially applicable ot the production of esters of alcohols derived from $C_4$ to $C_{18}$ mono-olefines, especially olefines containing up to 12 carbon atoms, but is of particular value in the preparation of esters from alcohols obtained from hydrocarbon mixtures with for example 6–8 carbon atoms, produced by thermally cracking higher hydrocarbons, e. g., paraffin wax, and in particular from alpha-olefines.

In the carbonylating stage suitable reaction conditions are, for example, 130°–190° C., preferably 150°–175° C., 200–300 (especially 250) atmospheres of $CO/H_2$ mixture and as catalyst 0.1% CO dissolved in the liquid feed. Preferably the cobalt is introduced as the soluble salt of an organic acid dissolved in the liquid feed, e. g. cobalt naphthenate, or cobalt acetate, laurate, hexahydrobenzoate, or 3,5,5,-trimethyl hexoate. Preferably, the reactor and auxiliary equipment should be lined with CO-resistant material such as copper, which permits the use of $CO:H_2$ mixtures with up to the stoichiometric ratio of 1:1.

In the hydrogenating stage suitable conditions are, for example, 250° C. and 150 atmospheres gauge using a copper catalyst, e. g. copper-on-zinc oxide or copper-on-chromia. The carbonylation product is treated for removal of cobalt before hydrogenating.

Esters with good colour characteristics, suitable especially for use as plasticisers, but also useful as synthetic lubricants, penetrating oils, indicator fluids and brake fluids, may be produced from the primary alcohols obtained from the carbonylation process by using known methods of esterification. Among such esters are the normal esters, especially the phthalates, sebacates, adipates, maleates and phosphates. If desired the individual alcohols can be separated from the Oxo-reaction product and used for the production of the corresponding ester. However, it is frequently desirable, especially in the case of the alcohols obtained from the $C_6$–$C_8$ alkenes, by reason of improved plasticiser properties of the resulting esters as well as the lower cost of production, to esterify the mixed alcohols directly.

Esters of the organic acids may be prepared, for example, by heating the corresponding acid anhydride with the alcohol in the presence of an inert medium such as a hydrocarbon solvent e. g. toluene or benzene, preferably in the presence of an acid catalyst, in the substantial absence of water, e. g. by distilling off the water formed as a heterogeneous azeotrope with the inert medium. In this manner the normal phthalates may be produced from phthalic anhydride using toluene as inert medium and sulphuric acid as catalyst.

A particularly suitable method for the production of the phthalic esters is that described in Serial No. 148,744, filed March 28, 1949, now abandoned, according to which the alcohol is reacted with an organic carboxylic acid or its anhydride in the presence of a strongly acidic catalyst and of a solid comprising alumina, silica and/or at least one aluminum silicate. That improvement of the ordinary method described in Serial No. 197,522, filed November 24, 1950, now abandoned, according to which the heating of the mixture is rendered as uniform as possible by: employing a heating bath and stirring; well mixing the acid anhydride or acid and alcohol before introducing the acid catalyst; and employing a moderate temperature, is also very suitable for the esterification step in the present invention.

Inorganic esters may be produced by known methods, such as those disclosed in Karrer's Organic Chemistry, 3rd English edition, pages 108–112.

By selecting suitable conditions and catalysts, it can be arranged that the major product of the carbonylation reaction is alcohol, and hydrogenation is not then necessary.

The invention is illustrated by the following example.

*Example*

An alkene mixture containing about 42% hexenes, 45% heptenes and 13% octenes by volume, of which about 30% were cyclic olefines or other compounds of high density and refractive index, as compared with open chain mono-olefines, was carbonylated by continuously feeding the alkene mixture containing 0.1% of cobalt as the naphthenate salt at a rate of 0.5 litre/litre/hour of reactor space at a pressure of 250 atmospheres 30:70/$CO:H_2$ at 157–175° C. using a gas/oil ratio of 1,000:1. The product after removing cobalt by pre-treatment with hydrogen was hydrogenated over a copper catalyst at 250° C., 150 atmospheres pressure, with a liquid space velocity of 0.5 litre/litre of catalyst volume/hour and a hydrogen/oil ratio of 12,000 cu. meters/cu. metre. The resulting product was fractionated under a reduced pressure of 40 mm. absolute in a 10 plate column and the fraction boiling 98°–132° C./40 mm. ($C_7$–$C_9$ alcohol cut) esterified by the following procedure.

Phthalic anhydride (1 mole) was dissolved in the alcohol (2.3 moles calculated as $C_8$ alcohol) and toluene (575 mls.) by stirring at 80° C. (oil bath). Sulphuric acid catalyst (0.5 ml. of 98% $H_2SO_4$) was added and the toluene refluxed on a Dean and Stark type decanter at a boiler temperature of 112 to 122° C. and bath temperature 136–148° C. to maintain a fast reflux rate. The resulting water was removed after 5½ hours refluxing. The product was then steam distilled, caustic washed, water washed and finally dried by heating to not more than 90° C. under reduced pressure. The resulting phthalate ester was then found to have a colour of 2.0 red and 6.0 yellow as determined in a standard Lovibond 6" cell.

The same alkene feed stock was taken and fractionally distilled and the compounds of high density and refractive index removed from it so that the resulting blend analysed by volume 50% hexene-1, 43% heptene-1 and 7% octene-1. This material was stabilised against peroxide formation by the addition of 1000 pts. per million by weight of 2,4-dimethyl-6-butyl phenol and an oxo-alcohol prepared from it in a similar manner to that described above. The phthalate ester prepared from this material by similar means had a colour of 0.3 red and 0.6 yellow as determined in a Lovibond 6" cell.

The original alkene mixture after the addition of soluble cobalt naphthenate (or cobalt carbonyl) reacted to form unsaturated alcohols due to the catalytic reduction of the hydroperoxides contained therein; a similar addition of cobalt catalyst to the blend obtained by distillation and stabilised with inhibitor gave no such reaction as it was substantially peroxide-free.

According to the invention the normal esters of normal heptanol and 2-methyl hexanol are produced from these alcohols obtained from normal hexene as starting material, and esters of the corresponding alcohols from the alcohols obtained from normal heptene and octene as starting materials.

We claim:

1. A process for the production of diesters having a color as determined in a Lovibond 6 inch cell not inferior to about 0.3 red and about 0.6 yellow from acyclic mono-alkene mixtures made by cracking hydrocarbons and containing alicyclic mono-olefines, di- and polyenes which tend to form hydroperoxides and unsaturated alcohols, which comprises preparing therefrom a mixture selected from the group consisting of (1) acyclic mono-alkenes from which have been separated by a method selected from the group consisting of distillation and solvent extraction alicyclic mono-olefines, di- and polyenes and hydroperoxides and unsaturated alcohols derived therefrom and (2) acyclic mono-alkenes containing the above mentioned alicyclic mono-olefines, di- and polyenes inhibited against formation therefrom of hydroperoxides and unsaturated alcohols by the addition of an oxidation inhibitor, carbonylating said mixture of acyclic mono-alkenes in the presence of a dissolved cobalt catalyst and in the substantial absence of hydroperoxides, hydrogenating the resulting product in the presence of a catalyst, and thereafter esterifying the resulting alcohol.

2. A process as claimed in claim 1 in which said mixture comprising acyclic mono-alkenes, which is substantially free from hydroperoxides and unsaturated alcohols derived from said alicyclic mono-olefines, di- and polyenes is obtained by a process of separation comprising distillation.

3. A process as claimed in claim 1 in which said mixture comprising acyclic mono-alkenes, which is substantially free from hydroperoxides and unsaturated alcohols derived from said alicyclic mono-olefines, di- and polyenes is obtained by a process of separation comprising solvent extraction.

4. A process as claimed in claim 1 in which the initial acyclic mono-alkene mixture comprises $C_6$–$C_8$ acyclic mono-olefines obtained by the thermal cracking of higher hydrocarbons and there is employed in the carbonylation stage a temperature of 130°–190° C., a pressure of 200–300 atmospheres gauge and as catalyst a soluble cobalt salt of an organic acid.

5. A process as claimed in claim 1 in which the acyclic mono-alkene mixture employed for the carbonylation step contains at most 5 mgms. of peroxide oxygen per litre.

6. A process for the production of diesters having a color as determined in a Lovibond 6 inch cell not inferior to about 0.3 red and 0.6 yellow from acyclic mono-alkene mixtures made by cracking hydrocarobns and containing alicyclic mono-olefines, di- and polyenes which tend to form hydroperoxides and unsaturated alcohols, which comprises dissolving therein a small amount of an oxidation inhibitor free from nitrogen, carbonylating the resulting mixture in the presence of a dissolved cobalt catalyst, hydrogenating the carbonylation product in the presence of a catalyst, and thereafter esterifying the resulting product.

7. A process as claimed in claim 6 characterized in that prior to the addition of said oxidation inhibitor, the acyclic mono-alkene mixture is treated by distillation for removal of alicyclic mono-olefines, di- and polyenes and any hydroperoxides and unsaturated alcohols derived therefrom that are present.

8. A process as claimed in claim 7 in which the acyclic mono-alkene mixture comprises a $C_6$–$C_8$ acyclic mono-alkene mixture obtained by cracking and in which the oxidation inhibitor is a tri-alkyl phenol present in an amount from 200–2,000 parts by weight per million parts of said acyclic mono-alkene mixture.

9. A process as claimed in claim 6 in which the oxidation inhibitor is an alkyl phenol and this is introduced into the initial acyclic mono-alkene mixture prior to carbonylation.

10. A process as claimed in claim 6 in which the initial acyclic mono-alkene mixture comprises a $C_6$–$C_8$ acyclic mono-alkene mixture obtained by cracking and in which the oxidation inhibitor is a tri-alkyl phenol in a proportion of from 200–2000 parts by weight per million of said alkene mixture this inhibitor being introduced into the said alkene mixture immediately after the latter has been obtained from the cracked product by distillation.

References Cited in the file of this patent

UNITED STATES PATENTS

| | | |
|---|---|---|
| 2,015,077 | Lawson | Sept. 24, 1935 |
| 2,415,102 | Landgraf et al. | Feb. 4, 1947 |
| 2,504,682 | Harlan, Jr. | Apr. 18, 1950 |
| 2,508,911 | Garner et al. | May 23, 1950 |
| 2,701,816 | Buchner et al. | Feb. 8, 1955 |

FOREIGN PATENTS

| | | |
|---|---|---|
| 614,010 | Great Britain | Dec. 8, 1948 |
| 493,493 | Belgium | Feb. 15, 1950 |

OTHER REFERENCES

Sherwood: Petroleum Processing, 794–800 (1949).